United States Patent
Yang

(10) Patent No.: US 6,883,824 B2
(45) Date of Patent: Apr. 26, 2005

(54) TWIN-BAR GOLF CART

(76) Inventor: Lien-Chuan Yang, 11F-1, No. 149, Sec. 3, Roosevelt Rd., Taipei (TW)

( * ) Notice: Subject to any disclaimer, the term of this patent is extended or adjusted under 35 U.S.C. 154(b) by 12 days.

(21) Appl. No.: 10/352,952

(22) Filed: Jan. 29, 2003

(65) Prior Publication Data

US 2004/0145137 A1 Jul. 29, 2004

(51) Int. Cl.[7] ............................................... B62B 1/12
(52) U.S. Cl. ................ 280/646; 280/47.26; 280/DIG. 6
(58) Field of Search ........................ 280/35, 38, 47.131, 280/47.24, 47.26, 47.27, 639, 645, 646, 652, DIG. 6

(56) References Cited

U.S. PATENT DOCUMENTS

| | | | | |
|---|---|---|---|---|
| 5,306,027 A | * | 4/1994 | Cheng | 280/30 |
| 5,338,054 A | * | 8/1994 | Imai et al. | 280/655 |
| 5,348,325 A | * | 9/1994 | Abrams | 280/40 |
| 5,421,604 A | * | 6/1995 | Wu | 280/655 |
| 5,582,421 A | * | 12/1996 | Liu | 280/646 |
| 5,683,195 A | * | 11/1997 | Liao | 403/102 |
| 6,079,718 A | * | 6/2000 | Liao | 280/47.26 |
| 6,099,024 A | * | 8/2000 | Liao | 280/655 |
| 6,131,917 A | * | 10/2000 | Walsh | 280/43.1 |
| 6,345,836 B1 | * | 2/2002 | Wu | 280/651 |
| 6,431,563 B1 | * | 8/2002 | Kang | 280/47.18 |
| 6,508,477 B1 | * | 1/2003 | Burkett | 280/47.26 |

* cited by examiner

Primary Examiner—Christopher P. Ellis
Assistant Examiner—Christopher Bottorff
(74) Attorney, Agent, or Firm—Dennison, Schultz, Dougherty & MacDonald

(57) ABSTRACT

A twin-bar golf cart including an upper frame, a lower frame, two struts for wheels and a folding seat, wherein the upper frame includes two mutual parallel bar combinations each with two telescopically connected bars, the bar combinations are connected each on one end thereof with a transverse bar and are connected pivotally each on the other open end thereof with the folding seat. The bottom of the folding seat is combined with the lower frame, and is connected on the rear side thereof with the two struts. With these members, a golf cart capable of receiving a golf bag is composed; when not in use, and the golf cart is separated from the golf bag, the golf cart can be folded to collapse in order to reduce the space occupied.

5 Claims, 7 Drawing Sheets

TWIN-BAR GOLF CART

BACKGROUND OF THE INVENTION

1. Field of the Invention

The present invention is related to a twin-bar golf cart, and especially to such golf cart which can be folded for storage, it does not occupy an overly large storage space, and is suitable to be used as a golf cart or the like.

2. Description of the Prior Art

The golf sport needs a very large ground, a golf kit is quite heavy; players hire caddies in formal international games, while in personal playing to strike golf balls in a golf course, a player himself mostly uses a hand-pull golf cart loaded with a golf kit.

The golf carts often used presently are mainly the golf carts each with a stem with a single bar; each of them structurally includes a stretchable main stem with a larger width, the stem is provided on the top thereof with a handle and on the bottom thereof with a lower stand; two wheels are provided laterally at the two sides of the lower stand. The stem thereby can be used to carry a golf bag. Such a golf cart with a stem of a single bar is structurally less firm; and after the golf bag is placed on the golf cart, a user feels inconvenient when he tows the golf cart by walking. And after a golf game, such a golf cart with a stem of a single bar still has a large volume when it is collapsed, and is quite inconvenient and space occupying in carrying and storage, hence this is the primary defect of such a golf cart with a stem of a single bar.

In view that the conventional golf cart needs improvement against the defect thereof, the inventor of the present invention got a motive to provide after hard study and designing a twin-bar golf cart of quite a small volume, small weight and being convenient for carrying and storage.

SUMMARY OF THE INVENTION

The main object of the present invention is to provide a twin-bar golf cart convenient for collapsing and of quite a small volume after collapsing.

Another object of the present invention is to provide a twin-bar golf cart convenient for carrying and storage and occupying no overly large space.

To get the above stated objects, the twin-bar golf cart of the present invention includes an upper frame, a lower frame, two struts for wheels and a folding seat; wherein the upper frame includes two mutual parallel bar combinations each with two telescopically connected bars, the bar combinations are connected each on one end thereof with a transverse bar and are connected pivotally each on the other end thereof at the open end of the upper frame with the folding seat. The bottom of the folding seat is combined with the lower frame, and is connected on the rear side thereof with the two struts. With these members, a golf cart capable of receiving a golf bag is composed; when not in use, and the golf cart is separated from the golf bag, the golf cart can be folded to collapse in order to reduce the space occupied.

The present invention will be apparent in its features after reading the detailed description of the preferred embodiment thereof in reference to the accompanying drawings.

DETAILED DESCRIPTION OF THE PREFERRED EMBODIMENTS

Figure 1:
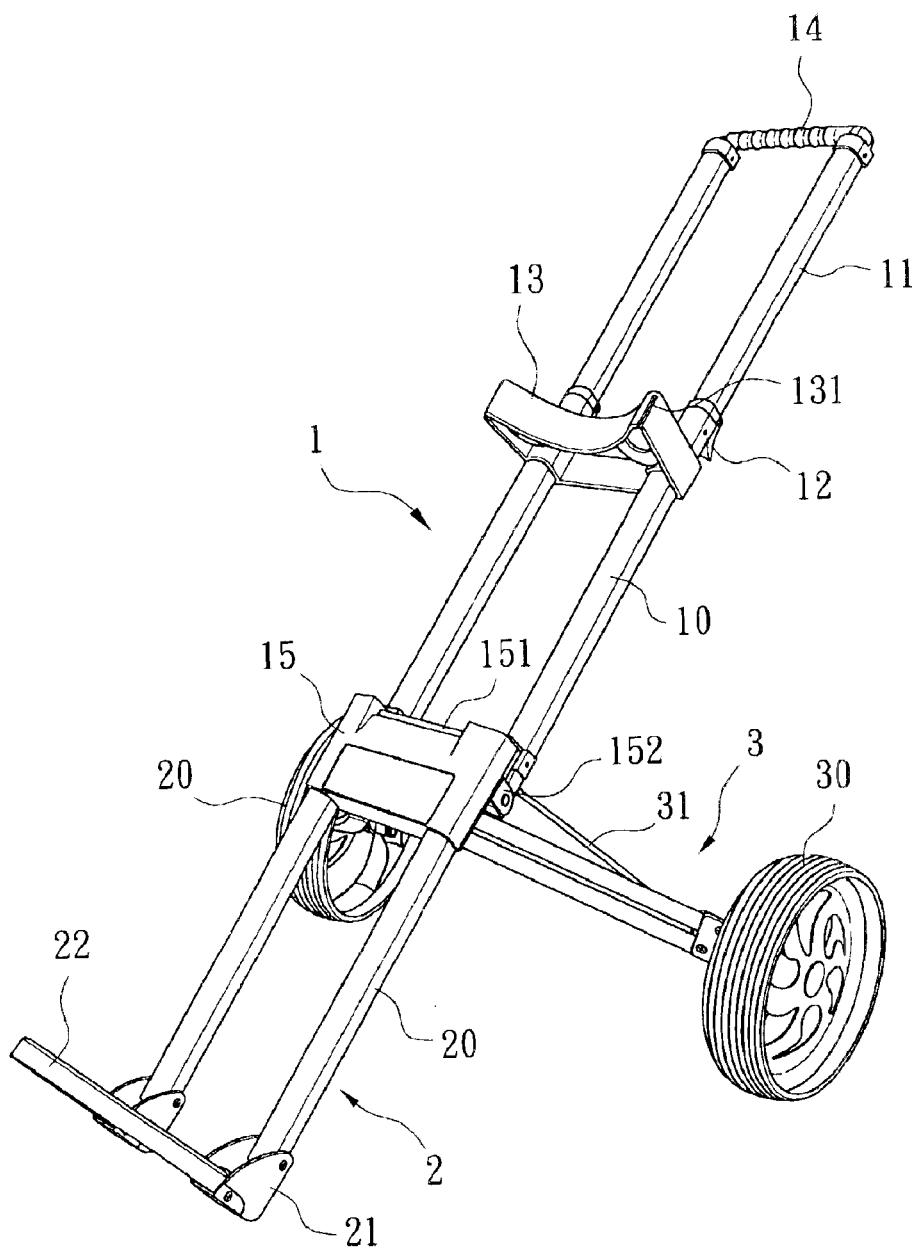
FIG. 1 is a perspective view of an embodiment of the present invention.

Referring to FIG. 1, the twin-bar golf cart of the present invention is comprised of an upper frame 1, a lower frame 2, two struts 3 for wheels and a folding seat 15; wherein the upper frame 1 includes two mutual parallel bar combinations each with a couple of telescopically connected bars each including a main bar 10 and a subordinate bar 11. A positioning pressing bar 12 is provided at each of the tops of the main bars 10 where the main bars 10 meet the subordinate bars 11. A transverse bar 14 is connected to the tops of the subordinate bars 11 to form an inversed "U" shaped frame which is telescopically connected for stretching and retracting. A golf bag 5 connecting an upper fixing mount 13 is suitably provided beneath the positioning pressing bars 12; the upper fixing mount 13 has an arched surface, and is provided on the two lateral edges thereof each with a slot 131 arranged in the longitudinal direction of the cart.

The lower frame 2 includes two bars 20, one end of each bar 20 is connected to a folding-limiting member 21, the folding-limiting member 21 is further pivotally connected to a bearing rack 22 for bearing the golf bag 5.

The two struts 3 for wheels each has an end movably and pivotally connected to a wheel 30, and is pivotally connected on the upper portion thereof to an auxiliary rod 31.

The width of the folding seat 15 is given in corresponding with that of the upper frame 1, it is provided at two ends on the rear side thereof with two protuberances 152 respectively movably connected with the ends of the main bars 10. The folding seat 15 is provided centrally on the upper end thereof with a pressing key 151 to control two contractible engaging blocks for hooking two folding blocks 153 on this upper end. The folding blocks 153 are provided in corresponding to the contractible engaging blocks with two inverse hooks 154; the folding blocks 153 are further connected respectively with the main bars 10, and are provided centrally on the rear sides thereof each with a protruding block 155, and are connected on the lower ends thereof with the lower frame 2, and this rear sides are connected with the two struts 3 for wheels; the other ends of the auxiliary rods 31 are connected with the protruding blocks 155 of the folding blocks 153.

Figure 2:
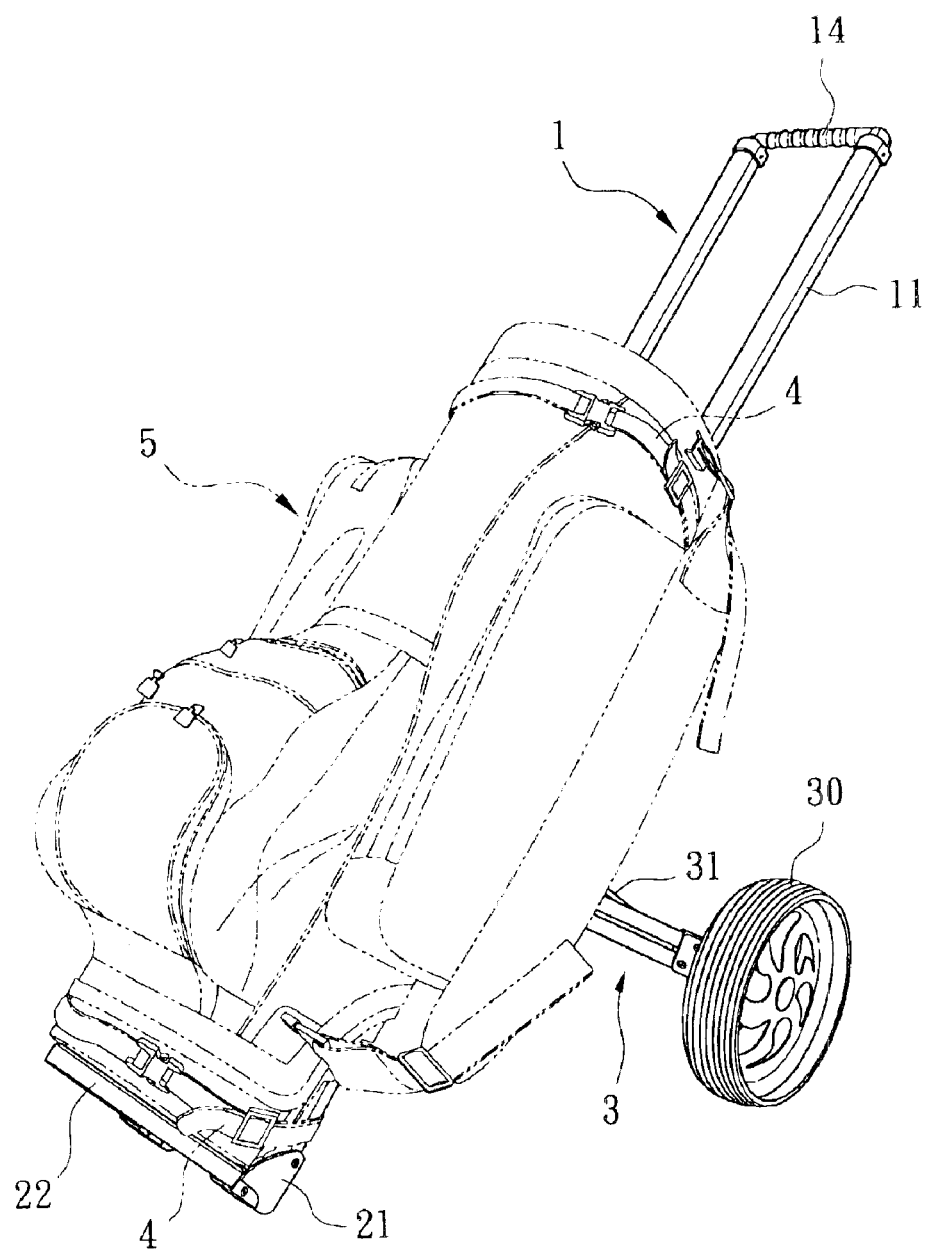
FIG. 2 is a schematic perspective view of the embodiment of the present invention, wherein, a golf bag is used thereon.

With the above stated members composing the present invention, the bearing rack 22 for bearing the golf bag 5 is folded down to make it able to receive the golf bag 5, and as shown in FIG. 2, two binding straps 4 attached to the golf bag 5 are wound around the golf bag 5, the upper binding strap 4 is extended through the slots 131 provided on the two lateral edges of the upper fixing mount 13 to tightly bind up the golf bag 5. And the lower binding strap 4 is wound around the lower frame 2 and the golf bag 5 for tightly binding up, in this way, the golf bag 5 is tightly bound up on the upper and the lower frames 1, 2. Then by holding and pulling of the transverse bar 14, the golf cart can be towed at ones will without carrying the golf bag 5 on the back of the user.

Figure 3:
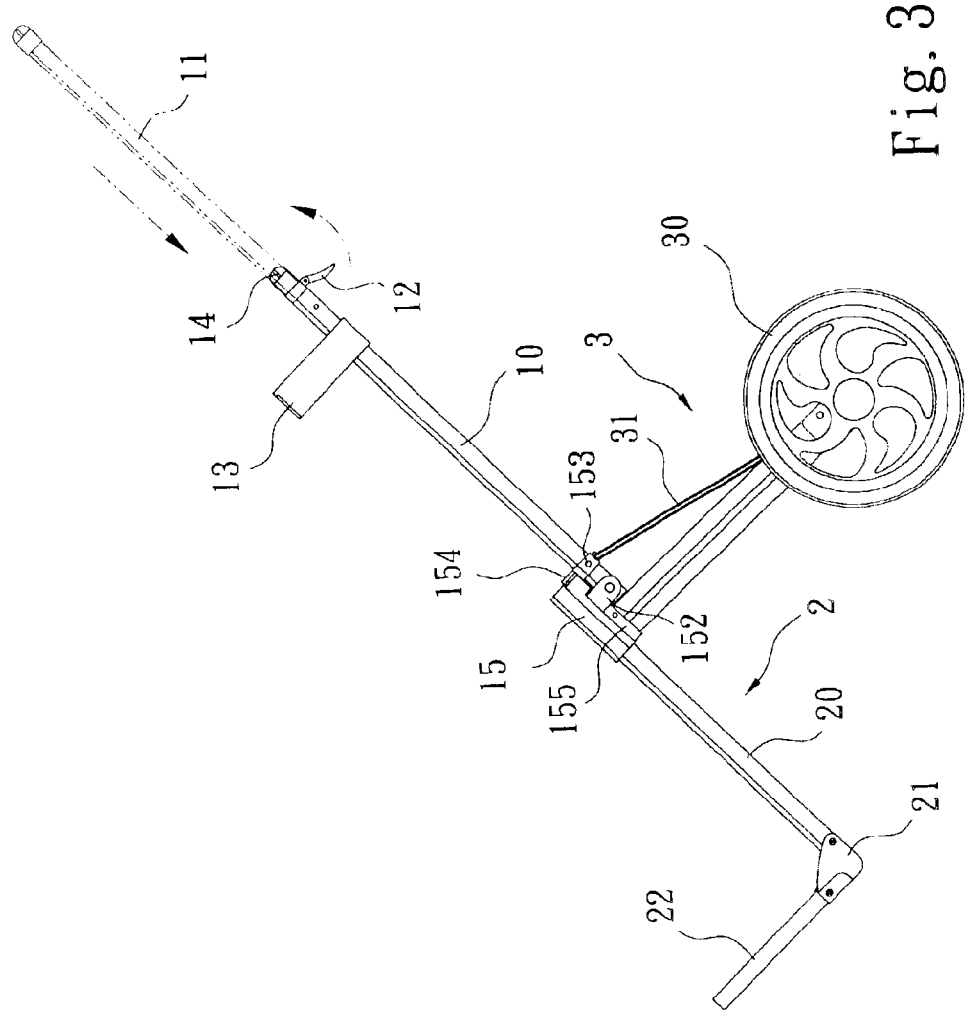
FIGS. 3–6 are schematic views showing collapsing of the embodiment of the present invention.
Figure 4:
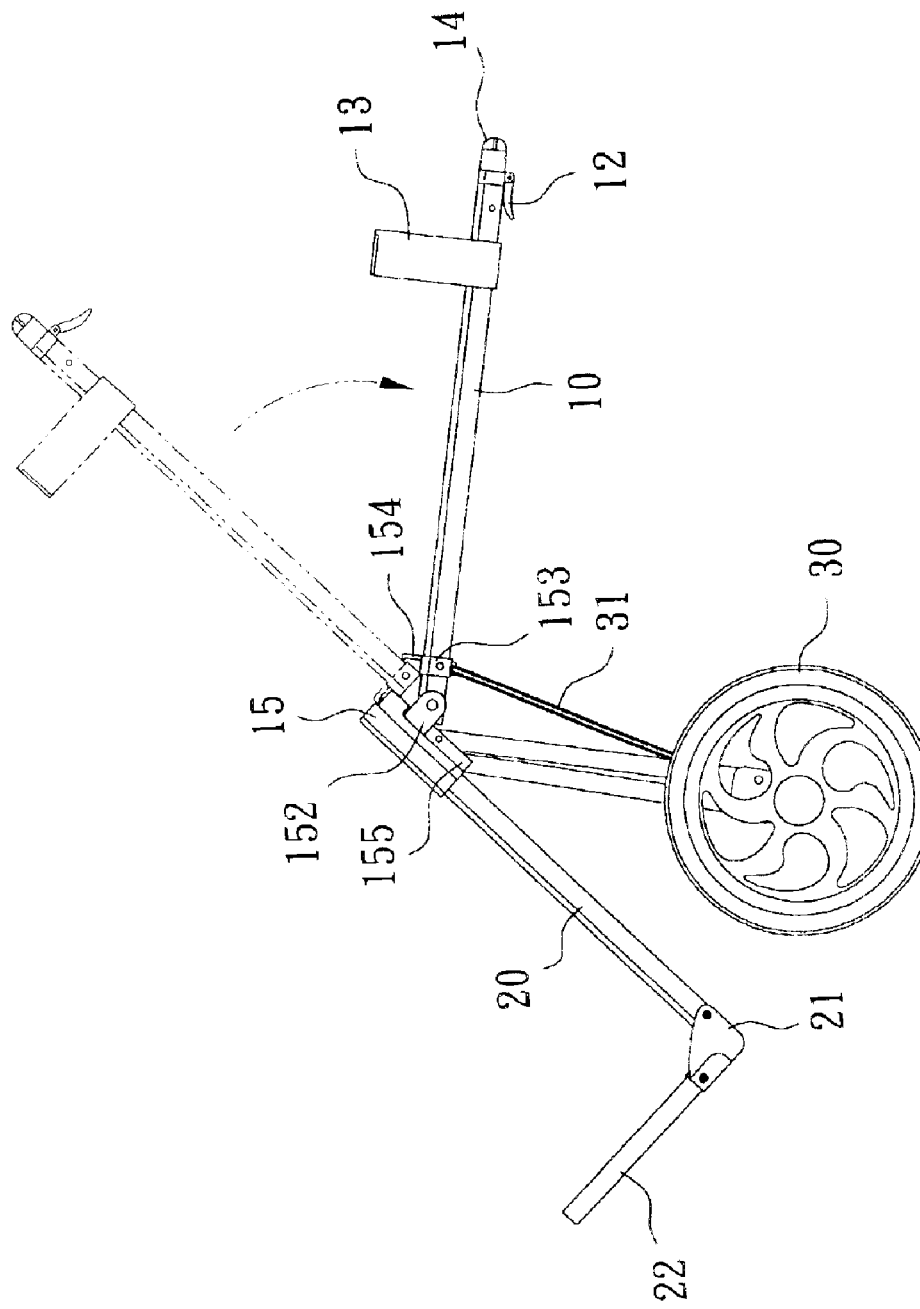
Figure 5:
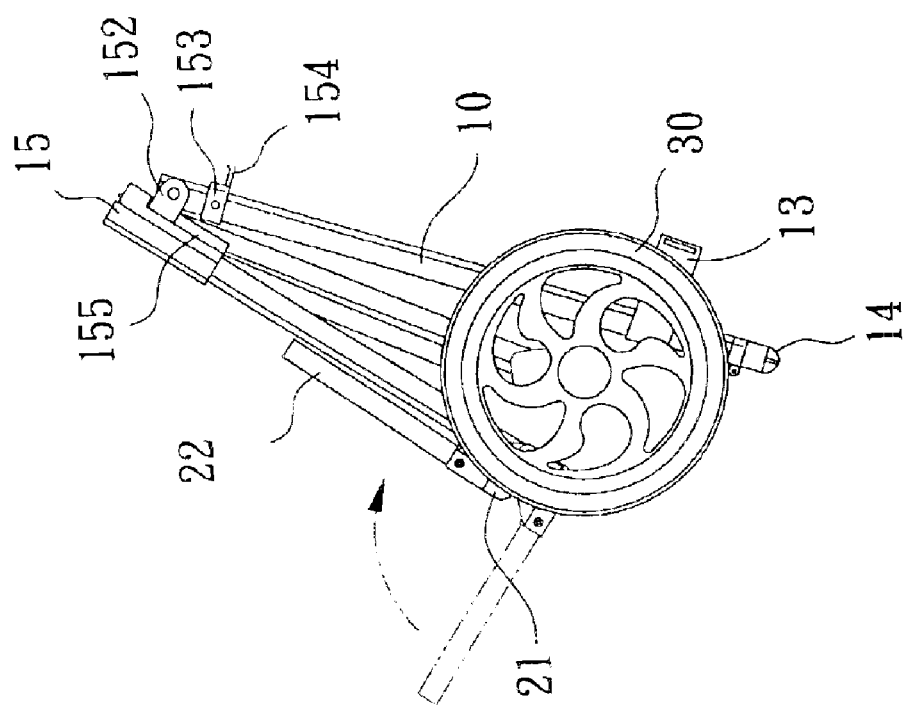
Figure 6:
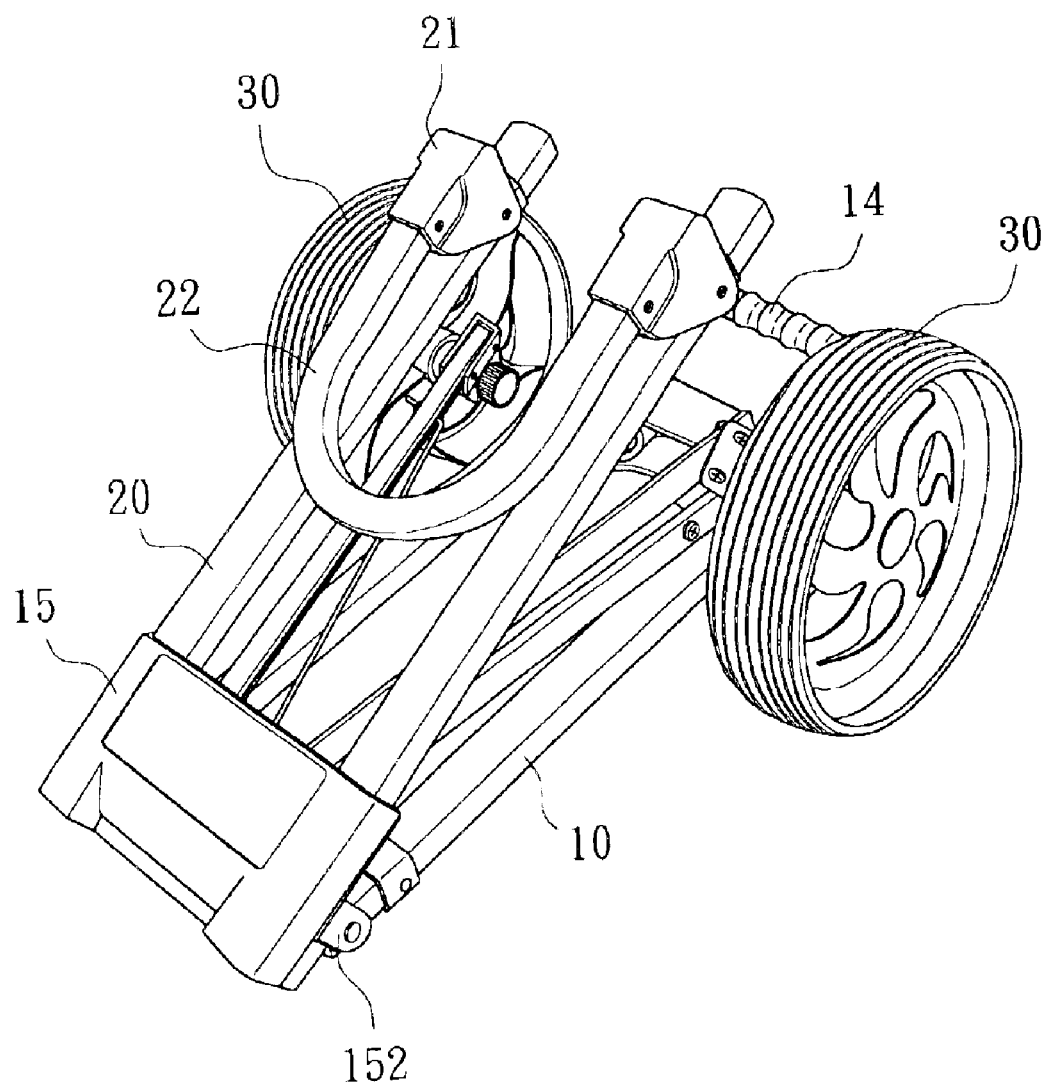
Figure 7:
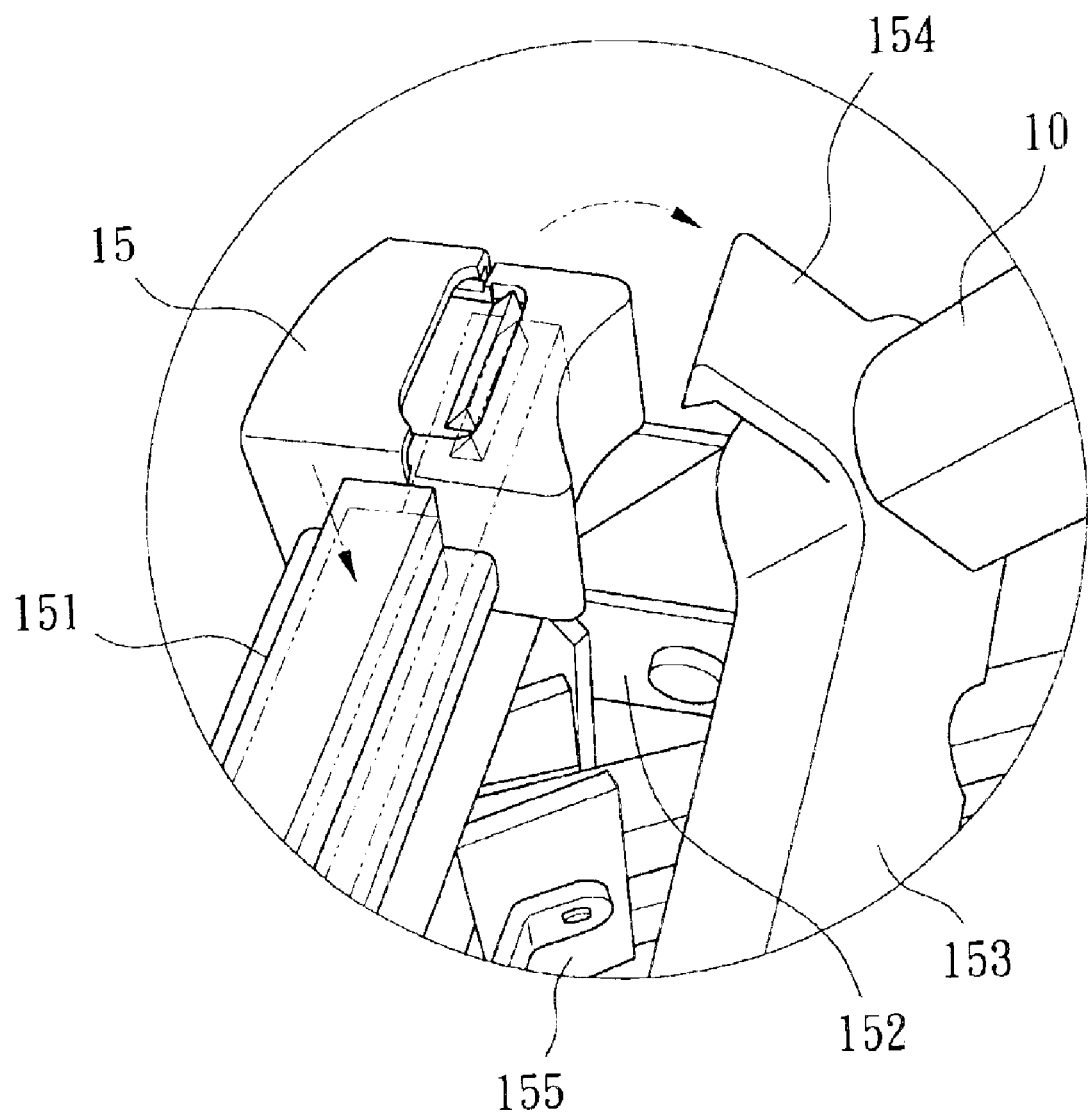
FIG. 7 is an enlarged schematic view of a part of the embodiment of the present invention.

After a golf game, when the golf cart is not in use, the two binding straps 4 are released to separate the golf bag 5 from the golf cart, the positioning pressing bar 12 is moved to open, the subordinate bars 11 are slipped into the main bars 10, and the positioning pressing bars 12 are closed to make positioning of the positioning pressing bars 12 in the main bars 10 (as shown in FIG. 3). Referring simultaneously to FIGS. 4 and 7, the pressing key 151 of the folding seat 15 is pressed down, the two inverse hooks 154 on the ends of the folding blocks 153 are released from engagement, the two protuberances 152 respectively movably connected with the ends of the main bars 10 are taken each as a center of a circle to allow the main bars 10 to bend down for 180 degrees, and by linking of the two struts 3 for wheels with the auxiliary rods 31, the wheels 30 are collapsed to abut against the main bars 10; and lastly, the bearing rack 22 provided on the folding-limiting members 21 for bearing the golf bag 5 is folded upwardly (referring to FIG. 5) to abut on the two bars 20; in this mode, the golf cart is folded to make the minimum volume (as shown in FIG. 6) to be more convenient for carrying and storage.

The structure of the present invention thereby has the following practical advantages:

1. The present invention has an effective arrangement in space occupying, so that when in use of the golf cart, it is firm and convenient for towing.
2. The golf cart of and the present invention can be collapsed in three sections, when it is not in use, it can be folded to make the minimum volume, thus is convenient for carrying or storage and does not occupy too much space.

The above stated are only for illustrating a preferred embodiment of the present invention, and not for giving any limitation to the scope of the present invention. It will be apparent to those skilled in this art that various modifications or changes can be made to the elements of the present invention without departing from the spirit and scope of this invention, all such modifications and changes shall fall within the scope of the appended claims.

Accordingly, the present invention surely can get the expected object thereof to provide a twin-bar golf cart; having thus described my invention with industrial value,

What I claim as new and desire to be secured by Letters Patent of the United States are:

1. A twin-bar golf cart comprising:

an upper frame including two mutual parallel bar combinations each with two telescopically connected bars including each a main bar and a subordinate bar, a transverse bar is connected to the tops of said subordinate bars, an upper fixing mount for a golf bag is connected to the upper ends of said main bars, the bottoms of said main bars form an open end of said upper frame, said traverse bar is adapted to being retracted toward the position just above said upper fixing mount by providing said telescopically connected bar combinations;

a lower frame including two parallel bars, the bottom ends of said bars are respectively connected to two folding-limiting members which are connected to a bearing rack for bearing said golf bag;

two struts for wheels each having an end connected to a wheel;

a folding seat pivotally connected on the top thereof to said main bars of said bar combinations at said open end of said upper frame, the bottom of said folding seat is combined with said lower frame, and is connected on the rear side thereof with said two struts, thereby, said upper frame is adapted to folding for 180 degrees to collapse, wherein the two struts are attached to the folding seat at an end opposing the end connected to each wheel, and wherein said folding seat is engaged on the upper end thereof with two lateral folding blocks, said folding blocks are connected respectively with said main bars at said open end of said upper frame, and said folding seat is provided on said upper end thereof with a pressing key to control two contractible engaging blocks provided at each side of said pressing key, thereby, two inverse hooks provided on said two lateral folding blocks respectively engaged with said two contractible engaging blocks are adapted to separating from said folding seat.

2. The twin-bar golf cart as stated in claim 1, wherein: said two bar combinations of said bar combinations is provided each with a positioning pressing bar above said upper fixing mount for said golf bag.

3. The twin-bar golf cart as stated in claim 1, wherein: said upper fixing mount for said golf bag of said upper frame is provided on the two lateral edges thereof each with a slot for extending of a binding strap therethrough.

4. The twin-bar golf cart as stated in claim 1, wherein: said two folding blocks engaged with said folding seat are provided each centrally with a protruding block, said protruding blocks are pivotally connected with auxiliary rods, the other ends of said auxiliary rods are pivotally connected to said two struts for wheels.

5. The twin-golf cart as stated in claim 1, wherein: the range of limiting of said folding-limiting members of said lower frame is 90 degrees, thereby, said bearing rack provided for bearing a golf bag is adapted to folding upwardly and downwardly.

* * * * *